United States Patent [19]

Walkiewicz, Jr. et al.

[11] Patent Number: 5,761,878
[45] Date of Patent: Jun. 9, 1998

[54] HORIZONTAL WRAPPER WITH A SIDE SEAL ATTACHMENT

[76] Inventors: Zigmunt J. Walkiewicz, Jr., 8620 Tanglewood Trail, Chagrin Falls, Ohio 44023; Franck E. Hansen, 842 Merrill La., Grayslake, Ill. 60030; Edmund D. Brett, 613 Bonniebrook Ave., Mundelein, Ill. 60060

[21] Appl. No.: 716,049

[22] Filed: Sep. 19, 1996

Related U.S. Application Data

[63] Continuation-in-part of Ser. No. 445,351, May 19, 1995, abandoned, which is a continuation-in-part of Ser. No. 977,773, Nov. 19, 1992, Pat. No. 5,417,041, which is a continuation-in-part of Ser. No. 791,659, Nov. 12, 1991, abandoned.

[51] Int. Cl.$^6$ .................. B65B 51/26; B65B 51/16; B65B 61/08
[52] U.S. Cl. .............. 53/373.5; 53/373.7; 53/374.4; 156/515
[58] Field of Search ............. 53/442, 450, 550, 53/373.4, 373.5, 374.4, 374.9, 374.5, 557; 156/515, 583.8

[56] References Cited

U.S. PATENT DOCUMENTS

| | | | |
|---|---|---|---|
| 3,237,371 | 3/1966 | Gerlach | 53/550 X |
| 3,328,936 | 7/1967 | Billeb | 53/550 X |
| 3,438,173 | 4/1969 | Omori | 53/374.6 X |
| 3,473,288 | 10/1969 | Nakamura et al. | 53/550 X |
| 3,477,191 | 11/1969 | Davis et al. | 53/550 X |
| 3,524,301 | 8/1970 | Zimmerman | 53/550 X |
| 3,552,088 | 1/1971 | Niwa | 53/373.5 X |
| 3,720,565 | 3/1973 | Cavanna | 53/374.4 X |
| 3,738,081 | 6/1973 | Heinzer | 53/550 |
| 4,219,988 | 9/1980 | Shanklin et al. | 53/550 |
| 4,260,447 | 4/1981 | Muscariello | 53/374.4 |
| 4,288,967 | 9/1981 | Seko et al. | 53/550 |
| 4,520,615 | 6/1985 | Engler et al. | 53/550 |
| 4,549,386 | 10/1985 | Wilson | 53/550 X |
| 4,553,377 | 11/1985 | Klinkel | 53/374.6 X |
| 4,608,797 | 9/1986 | Shabram, Jr. et al. | 53/550 X |
| 4,680,073 | 7/1987 | Brunner et al. | 53/373.5 X |
| 4,696,147 | 9/1987 | Noh | 53/550 |
| 4,712,357 | 12/1987 | Crawford et al. | 53/550 X |
| 4,798,038 | 1/1989 | Litt | 53/373.5 |
| 4,858,416 | 8/1989 | Monaghan | 53/373.5 X |
| 4,870,802 | 10/1989 | Cerf | 53/550 X |
| 5,125,216 | 6/1992 | Redaelli | 53/550 |

*Primary Examiner*—Horace M. Culver
*Attorney, Agent, or Firm*—Chattman, Gaines & Stern

[57] ABSTRACT

A continuously operating machine is provided for wrapping articles with a heat shrinkable plastic film automatically and sequentially. Articles are continuously, transferred along a horizontal pathway to a plurality of processing stations. At a first station, articles are tubularly overwrapped and sealed along a side edge thereof with excess film material being automatically trimmed away. Next, the articles are separated one from the other at a second station and at a last succeeding station, the resulting wrapped articles are subjected to thermal film shrinking. The side seal and trim apparatus includes a heat seal and trim unit which engages free side edges of the film tube to one another and trims excess away, the unit being sandwiched between drive and alignment members.

23 Claims, 9 Drawing Sheets

HORIZONTAL WRAPPER WITH A SIDE SEAL ATTACHMENT

CROSS REFERENCE TO RELATED APPLICATION

This application is a CIP of U.S. patent application Ser. No. 08/445,351, filed May 19, 1995, and now abandoned, which is a CIP of U.S. patent application Ser. No. 07/977,733, filed Nov. 19, 1992, and now U.S. Pat. No. 5,417,041, which is a CIP of Ser. No. 07/791,659, filed Nov. 12, 1991, and now abandoned.

BACKGROUND OF THE INVENTION

Field of the Invention

This invention relates to an improved horizontal packaging machine, or wrapper, especially a continuously operating machine for wrapping articles with a heat shrinkable plastic film or the like automatically and sequentially, and producing a side sealed; trimmed package for each article.

Description of the Prior Art

Various packaging machines for wrapping materials automatically and sequentially with heat shrinkable film are available commercially from various manufacturers. However, these machines do not offer an attachment or unit for creating a side seal which is trimmed as it is formed, creating a further benefit of keeping heat from the sealing station away from articles being packaged.

The art needs a new and improved wrapping machine which is adapted for use with heat shrinkable wrapping film and which has a new and improved side seal attachment or unit providing the described advantages and which has simplified configuration, adjustments and operational features.

SUMMARY OF THE INVENTION

This invention relates to a continuously operating package wrapping machine for shrink film and the like which automatically and sequentially wraps packages with a plastic film or the like, and to a method for accomplishing same. The machine and the method each utilize a successive combination of a wrapping station, a side seal and trim station, a package separating station and a film shrink station.

The invention relates to a new and very useful side seal and trim station attachment or unit for a sequence of longitudinally wrapped packages and to a method for continuously and sequentially side sealing and trimming each wrapped and continuously advancing package of the package sequence.

The method of the invention can be practiced at surprisingly high package unit operating rates.

Other and further aspects, objects, aims, features, advantages, applications, variations, embodiments, and the like will be apparent to those skilled in the art from the present specification taken with the accompanying drawings and appended claims.

DESCRIPTION OF PREFERRED EMBODIMENT

Figure 1:
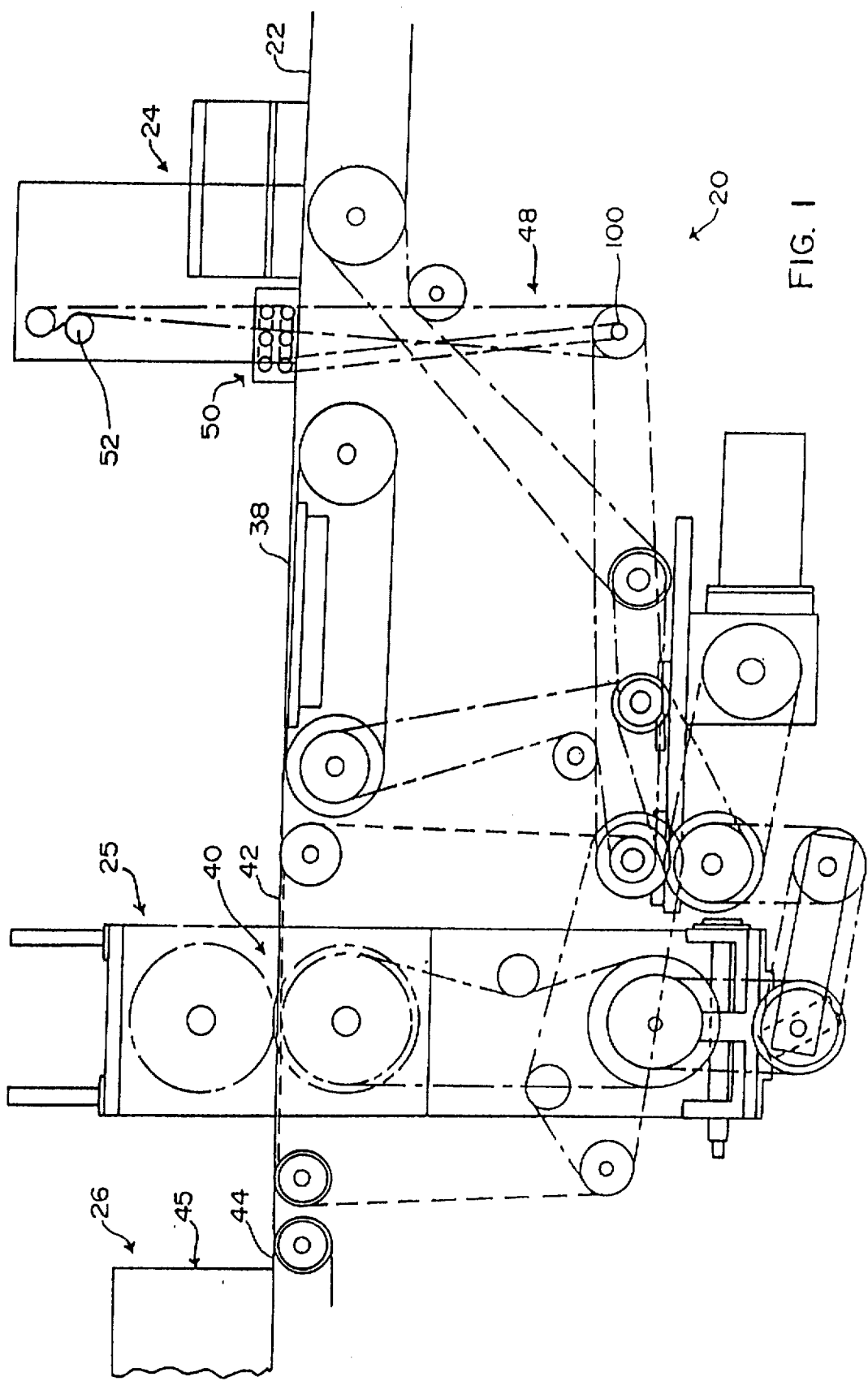
FIG. 1 is a partial diagrammatic side elevational view of the embodiment of a shrink film wrapping machine of this invention.

Referring to the Figures in greater detail there is illustrated therein a section of one embodiment of a shrink film wrapping machine of the present invention designated in its entirety by reference number 20.

In machine 20, packages, articles or objects that are being wrapped continuously and sequentially are moved horizontally along a conveyor pathway which extends through three successive stationary processing stations 24, 25, and 26. Thus, a plurality of similarly sized objects which are to be individually wrapped by machine 20 with a heat shrinkable film 27 (FIG. 2) are sequentially deposited upon the input end of an endless conveyor 22, conveyor 22 continuously operating and advancing to the left in FIG. 1, moving to the first processing station 24.

First processing station 24 is provided for longitudinally and continuously overwrapping successive objects with a film overwrap 27 having a tubular configuration. The tube center region encompasses the articles therein which are to be sealed into packages.

Thus, as each object moves through station 24, it becomes wrapped in a manner where free side edges 28 of the film 27 to be sealed to one another meet and lie along a side edge 30 of the articles 32. The film 27 is preferably comprised of a thermally shrinkable polymeric material.

In station 24, free opposite side edges 28 of the film tube 27' are brought together by a plow arrangement 34 so that the edges 28 lie along the side edge 30 of the articles 32 being wrapped. The edges 28 are then thermally interfacially bonded together so as to hold the coplanar edges of the formed film tube 27' closed and together with material excess 36 being cut away to form a clean side seal at 37.

As each thus wrapped article 32 leaves station 24, it is packaged by a continuously advancing conventional type vacuumized endless belt conveyor 38. Preferably, belt conveyor 38 is provided with a plurality of closely spaced apertures 39 that extend therethrough. Thus, the wrapped articles 32 are held in fixed position relative to one another upon an upper surface of belt conveyor 38. Also, the vacuum provides the force to pull and move the wrapped articles 32 from station 24 to the next processing station 25.

From a tail end of belt conveyor 38, each object is transferred to a conveyor 42 which commences in adjacent, longitudinally spaced relationship to belt conveyor 38. Conveyor 42 moves objects 32 continuously through station 25 wherein a cross head sealer and cutter 40 operates continuously.

In cross head sealer and cutter 40 operation, first a forward end of the tube surrounding each article 32 is cut and heat fused. Then, as each resulting individual articles 32 continues its advance on the belt conveyor 42 the rearward or trailing end of each such bag being formed is cut and heat fused, thereby completing formation of a packaging bag about each article 32.

The cutting and heat fusing preferably takes place along a line which extends transversely across the belt conveyor 42 and is midway between each pair of successive longitudinally spaced article 32 on the belt conveyor 42. Preferably also, this line is midway between the top and the bottom ends of each pair of successive articles 32.

From station 25 and belt conveyor 42, each now completely bagged articles 32 is advanced and is transferred to an endless belt off-feed transfer conveyor 44 which is longitudinally spaced from but in adjacent relationship with belt conveyor 42. Conveyor 44 in embodiment 20 is a linking conveyor which functions to deliver wrapped and sealed articles 32 to a station 26 where a continuously operating shrink tunnel 45 is situated. Each article 32 emerging from tunnel 45 is completely packaged within a heat shrunk side sealed, trimmed film package.

Packaged articles 32 upon reaching the end (not shown) of belt conveyor 44 are collected for storage, subsequent further bulk packaging, shipment, or the like, as desired.

Figure 2:
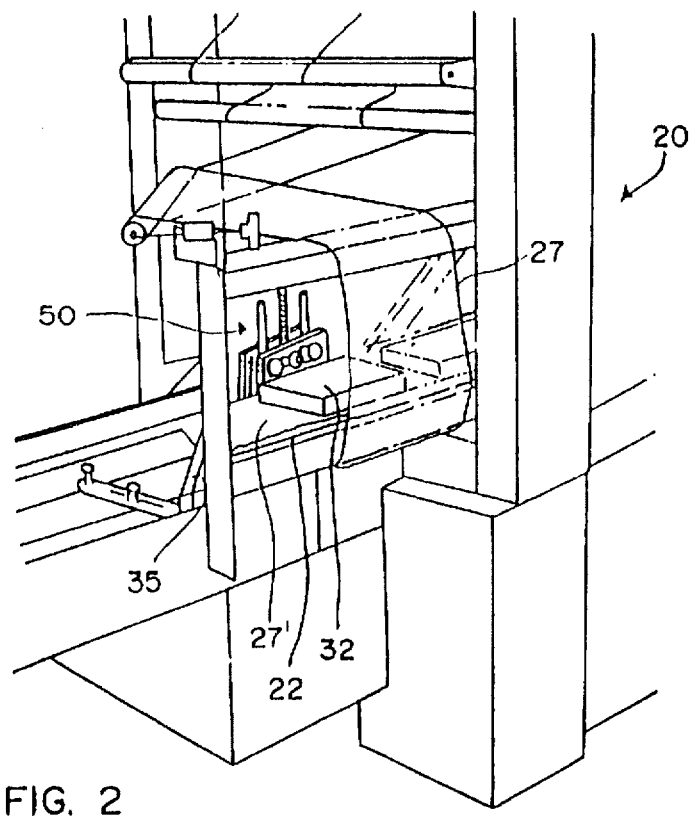
FIG. 2 is a perspective view of a forward end of the machine of FIG. 1.
Figure 3:
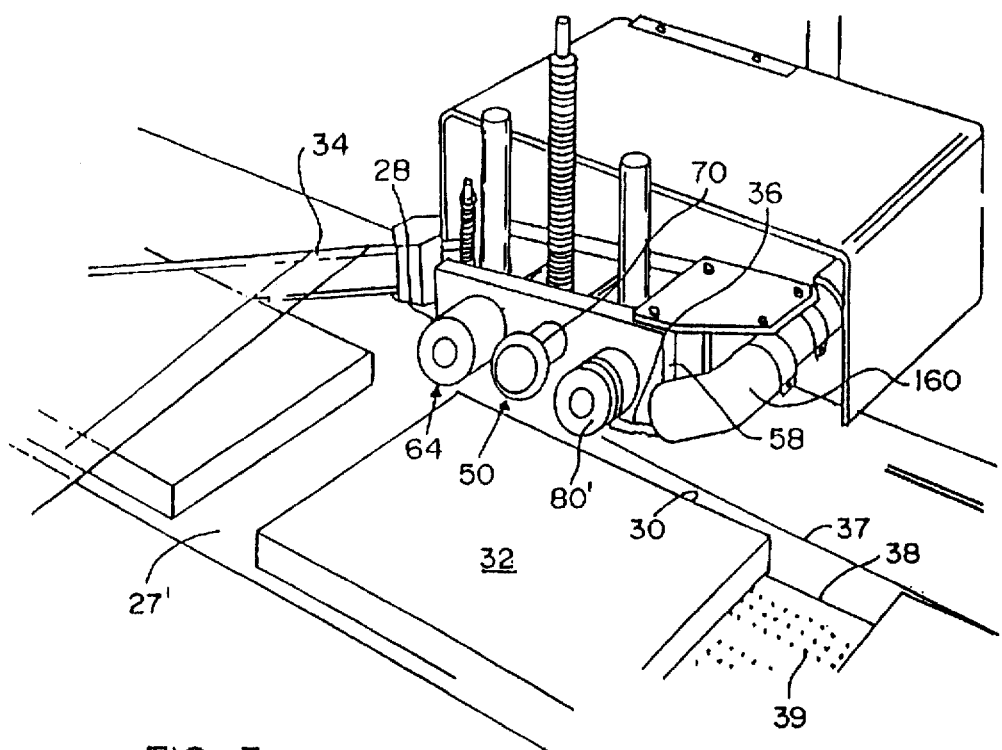
FIG. 3 is an enlarged, detailed view of the side seal and trim station and unit.
Figure 4:
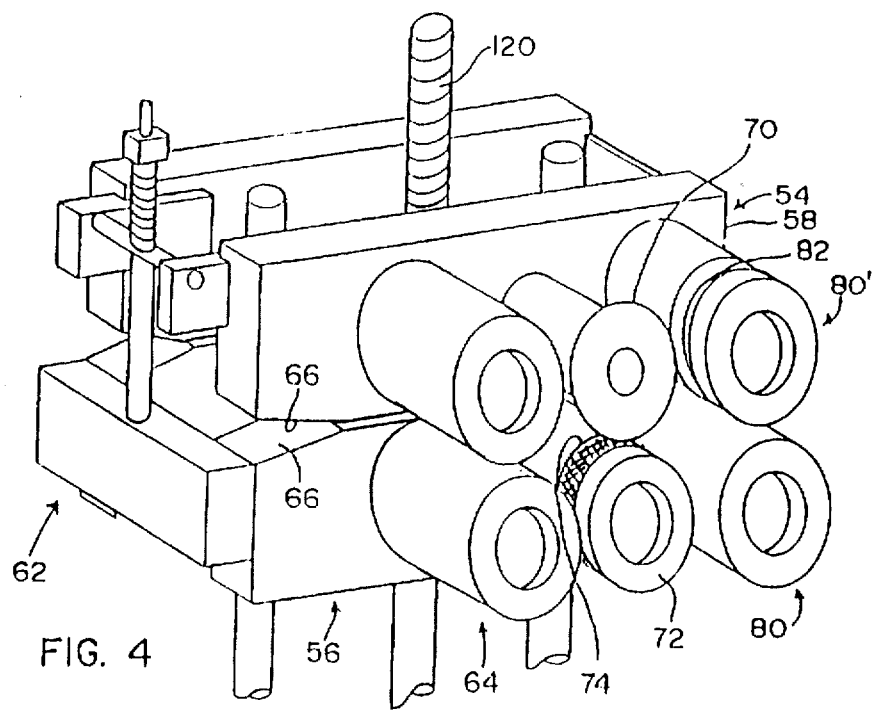
FIG. 4 is an enlarged perspective view showing apparatus components forming the apparatus at the station in a functional mode thereof.

The machine 20 incorporates a drive subsystem 48 which causes the conveyors, the film wrapper, the side seal, and trim unit 50 at station 24, and the cross head sealer and cutter 40 at station 25 to operate synchronously with each other. The drive subsystem 48 is illustrated in FIG. 1 and is described in detail in U.S. patent application Ser. No. 791,659, the teachings of which are incorporated herein by reference.

Turning now particularly to FIGS. 2–12, there is illustrated therein the station 24 incorporating therein the novel side seal and trimming unit 50 made in accordance with the teachings of the present invention.

As shown, the side seal and trim unit 50 is incorporated immediately adjacent the plow arrangement 34 where the film 27 fed from a 52 roll thereof is placed about consecutively supplied articles in the form of a continuous tube 27', with free side edges 28 of the film being approximated along a longitudinal side edge 30 of the articles 32 therewithin.

By creating a side seal rather than the commonly formed seal which lies over one surface of the article 32 to be packaged, heat need not be applied against the article 32.

Rather the heat seal and trimming unit 50 is herein proposed which creates a seal alongside, rather than upon the articles 32. The unit 50, as will be described in greater detail hereinafter, not only creates a neat, precise side seal, but also trims away excess edge area of the film 27 beyond the seal so that a neat, packaged article 32 is produced.

It is seen from FIGS. 3–9 that the unit 50 includes two jaws 54 and 56, the first jaw being a top or upper jaw 54, and the second being a bottom or lower jaw 56, the jaws 54 and 56 being separable from each other toward a trailing edge 58 thereof by a small pneumatic piston and cylinder arrangement 60.

It will be seen that a forward end 62 of the jaws 54 and 56 is hinged, with the hinged end 62 being particularly configured to maintain a first set of alignment and drive members 64 adjacent the end 62 abutting at all times. To provide such maintained abutment even when the jaws 54 and 56 are disengaged, the jaws 54 and 56 are each provided with a corresponding ramped surface portion 66 which creates a relief when the top jaw 54 tilts, thus maintaining the drive members 64 adjacent one another.

Proximal to these drive members 64 is a heat sealing and cutting head 70 which is mounted on the top jaw 54 and which coacts with a cooperating rotating base member 72 therebeneath against which the head 70 seats when the jaws 54 and 56 are approximated.

This base member 72 incorporates a circumferential area 74 thereon which is made of thermally insulating material. Thus, when film 27 is engaged between the head 70 and the insulated base 72, it is sealed by heat generated within the head 70 and trimmed against the insulated base area 74.

Next on the unit 50 follows a second pair of drive and alignment members 80 which are similar to the first pair 64. Here because empirical testing has shown that the heated area of the film 27 is not sufficiently cooled and may stick to the members 80, the upper member 80' is circumferentially slotted at 82, allowing for some relief and significantly decreasing, if not altogether eliminating potential jamming of the hot film in the area of the seal between the drive members 80 and 80'.

Figure 7:
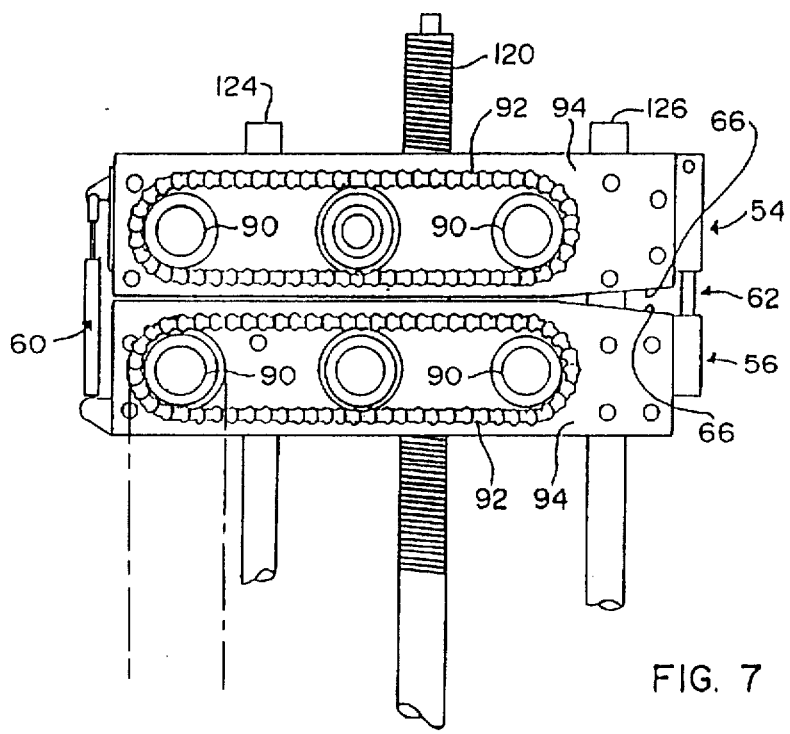
FIG. 7 is a rear view of the unit showing a synchronized chain drive thereof.
Figure 8:
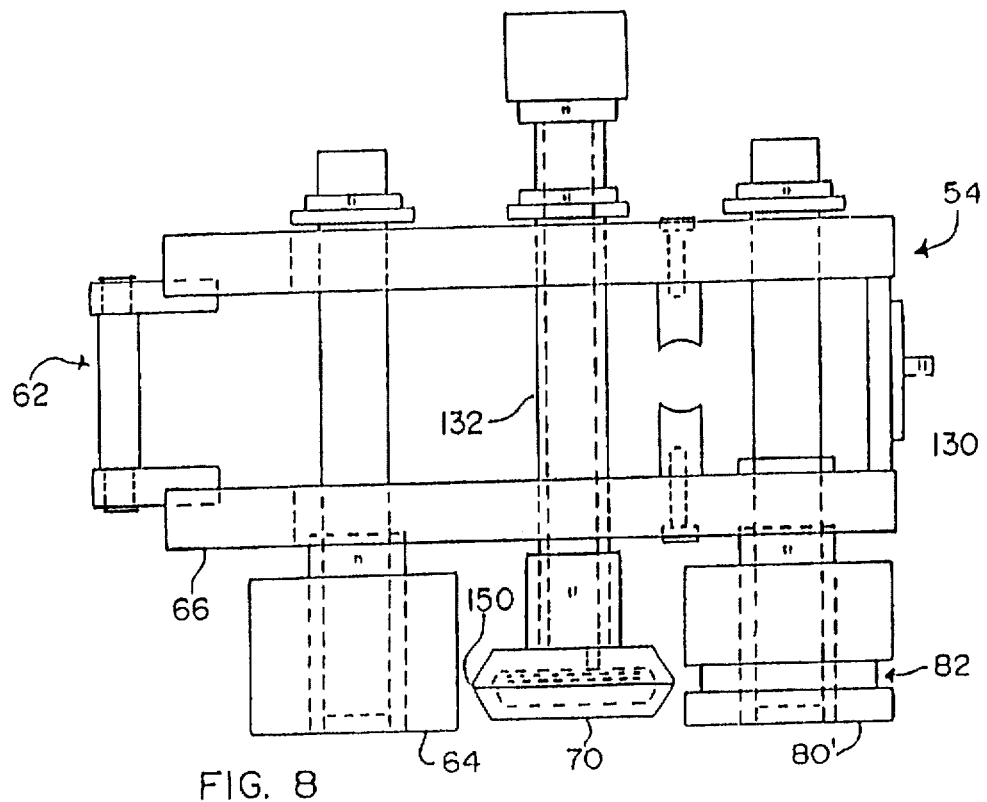
FIG. 8 is a top plan view of a top jaw of the unit.
Figure 9:
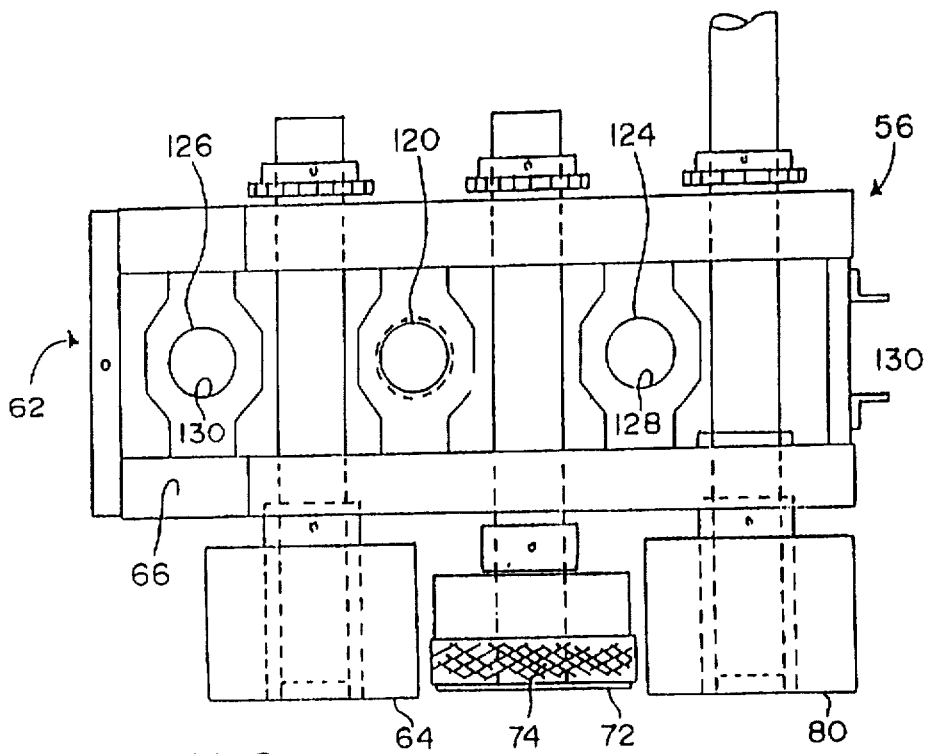
FIG. 9 is a top plan view of a bottom jaw of the unit.
Figure 10:
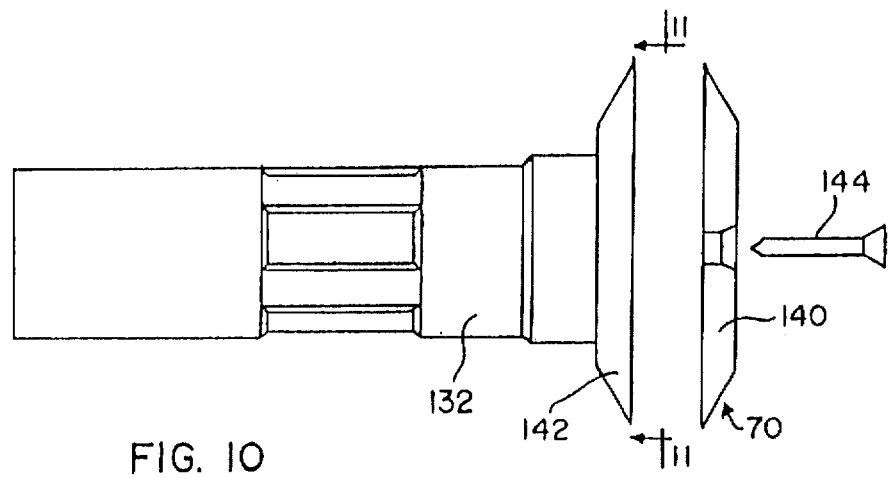
FIG. 10 is an exploded side view of a heat seal head of the unit.
Figure 11:
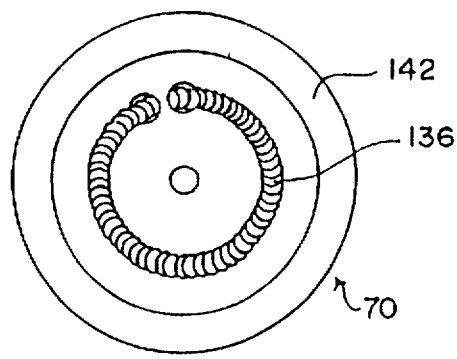
FIG. 11 is a perspective view of a heat seal head of the heat seal unit and is taken along line 11—11 of FIG. 10.
Figure 12:
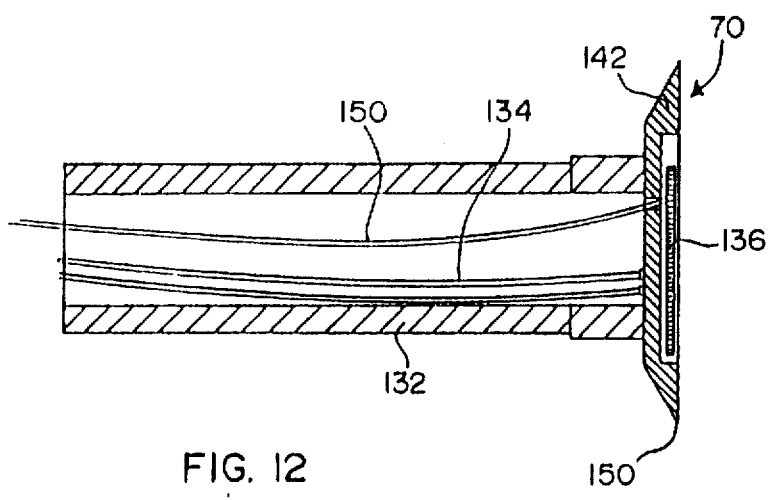
FIG. 12 is a longitudinal cross section through the heat seal unit of FIG. 10.

The drive members 64 and 80 comprise cylindrical wheel elements which are shaft mounted, the toothed gear shafts 90 being synchronously engaged on each jaw 54 and 56 by a drive chain 92 on back side 94 of the unit 50 as shown in FIG. 7.

This drive system is driven by a secondary chain drive 95 which originates from a drive shaft 100 which also synchronizes operation of the other units 25 and 26 of the machine 20.

Thus, when one unit speeds up or slows down, the other units follow.

Obviously, articles 32 to be packaged come in various sizes.

To accommodate articles of various thicknesses and widths, the unit 50 must be moveable, both in the vertical and horizontal planes.

Figure 6:
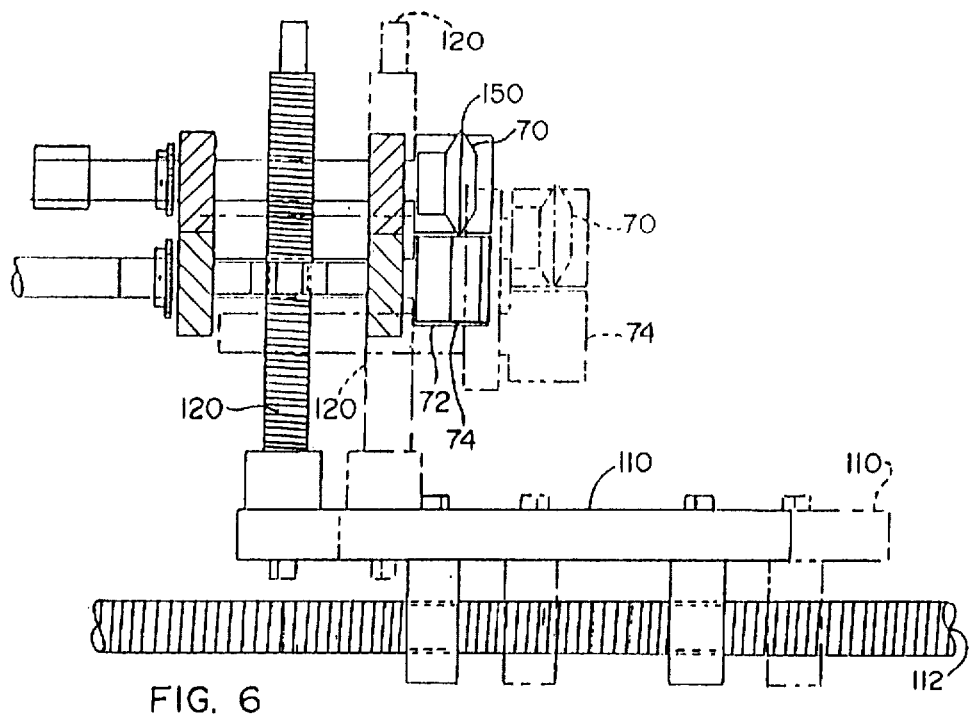
FIG. 6 is an enlarged side view of the unit showing vertical and horizontal adjustability thereof.

In this respect, as best shown in FIG. 6, the unit 50 rides on a platform 110 which is horizontally moveable toward and away from the adjacent conveyor 22 upon which the articles 32 are carried, thus accommodating narrow as well as wider articles 32. The platform 110 is engaged to a threaded horizontal shaft 112 along which it can be moved in a known manner.

Further, the unit 50 is carried upon a threaded vertical shaft 120 which extends upwardly from the platform 110. Upon this shaft 120, the height of the unit 50 can easily be adjusted to accommodate thick as well as thinner articles 32 to consistently provide a centered side seal therealong.

To maintain alignment of the jaws 54 and 56 at all times, two alignment rods 124 and 126 are provided, extending upwardly through end ports 128 and 130 respectively in the bottom jaw 56, from their source on the platform 110. The bottom jaw 56 is thus maintained aligned relative to the conveyor 22 at all times, with the upper jaw 54 being maintained aligned therewith by the method of engagement therebetween.

In this respect, as defined earlier, the one end 62 of the jaws 54 and 56 is pivotably hinged together while the opposite end 58 incorporates the hydraulic arrangement 60 for causing disengagement and pressurized engagement at the end 58.

As also stated before, the leading drive members 64 are at all times maintained engaged. Such maintained engagement is preferred so that if a shut down is ever necessary, the free side edges 28 of film 27 will not come out of alignment, and the unit 50 can simply have the jaws 54 and 56 reengage after shutdown, with the unit 50 becoming once again functional without the necessity of refeeding the film 27 thereinto.

It will be further understood that the rotatable members 64 and 80' mounted on the upper jaw 54 are driven upon the pressurized engagement between the trailing drive members 80 and 80' on the jaws 54 and 56.

Thus, when the jaws 54 and 56 are separated, rotation of all elements ceases until the jaws 54 and 56 are locked back together, with the pressure developed between the trailing drive members 80 and 80' by the hydraulic arrangement 60 once again driving all of the members.

To accommodate the stress created by being driven members, the trailing drive members 80 and 80' are bearing 130 mounted.

Obviously, all drive members are made of a highly frictional material such as rubber.

Turning now to a more detailed study of the heat sealing and cutting head 70, the head 70 will be seen to be mounted on a hollow rotatable shaft 132 through which electrical wiring 134 can be run to the heated head 70. Obviously, since the head 70 and shaft 132 are rotatable, a rotary electrical connection (not shown) of known type must be used so that twisting of the wiring 134 does not occur.

The electrical wiring 134 engages a circular ceramic heater element 136 seated within the heater head 70, the head 70 being comprised of two dish shaped members 140 and 142 which, when joined together in a suitable manner, form a pointed circumferential edge 150 which shears through the film 27 fed therebeneath, with the heat extending toward the article 32 and sealing an adjacent area of the film at 37.

To produce a clean cut and to accommodate temperatures in the range of 300–400° F., it is preferred to form the head 70 of stainless steel, which may be coated with an insulating and slick material such as polytetrafluoroethylene. Also, as is known, means 152 for temperature control may be incorporated to accommodate various types of film 27.

Turning back to FIG. 3 briefly, it will be seen that an optional vacuum system 160 may be provided downstream of the unit 50 to collect the cut off film material, if desired.

Figure 13:
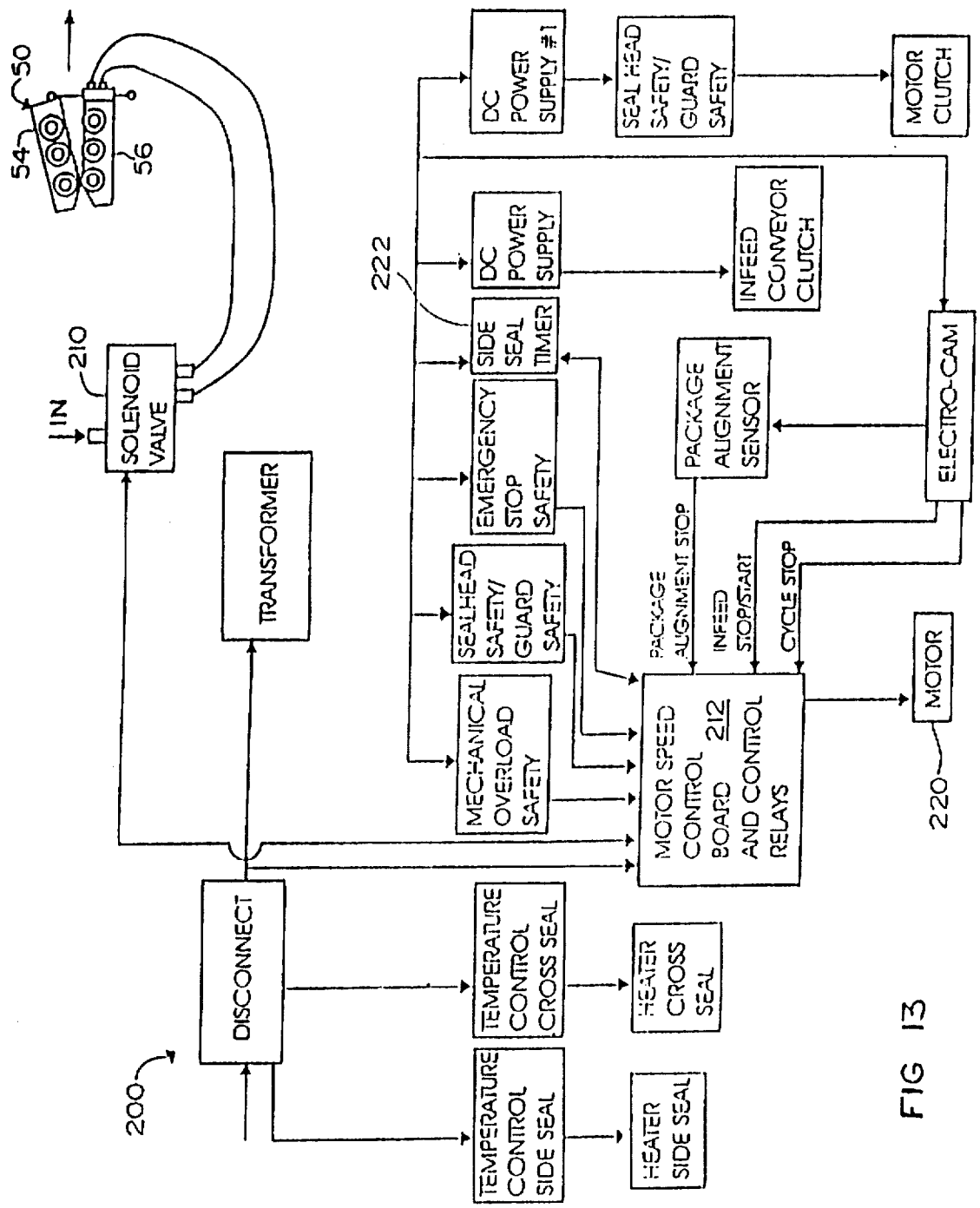
FIG. 13 is a simplified block diagram of the electrical system used for operative control of the side seal and trim unit in conjunction with that of the shrink wrap machine.

In FIG. 13 is shown the diagrammatic representation of the machine control system 200 including controls for the side seal and trim unit 50.

As shown, the hydraulic system 60 for opening and closing the unit 50 is operated by a solenoid 210 from a motor control board 212 for the machine 20 in a manner where the jaws 54 and 56 of the unit 50 are opened whenever a motor 220 powering the machine 20 stops.

A timer 222 for the unit 50 is further provided which is in communication with the motor control board 212 as well and causes the jaws 54 and 56 to reengage, via solenoid valve 210 activation, just before motor 220 start up so that the film 27 is already firmly gripped between the jaws 54 and 56 at motor 220 engagement, with no slack being formed in the film 27, which could cause problems such as folds or overrun of film 27 in certain areas of the seal being formed at 37.

Obviously, temperature of the heat head 70 and operation thereof are also controlled by the machine system 200.

As described above, the machine 20 and side seal and trim unit 50 thereof provide a number of advantages, some of which are described above and others of which are inherent in the invention.

Figure 15:
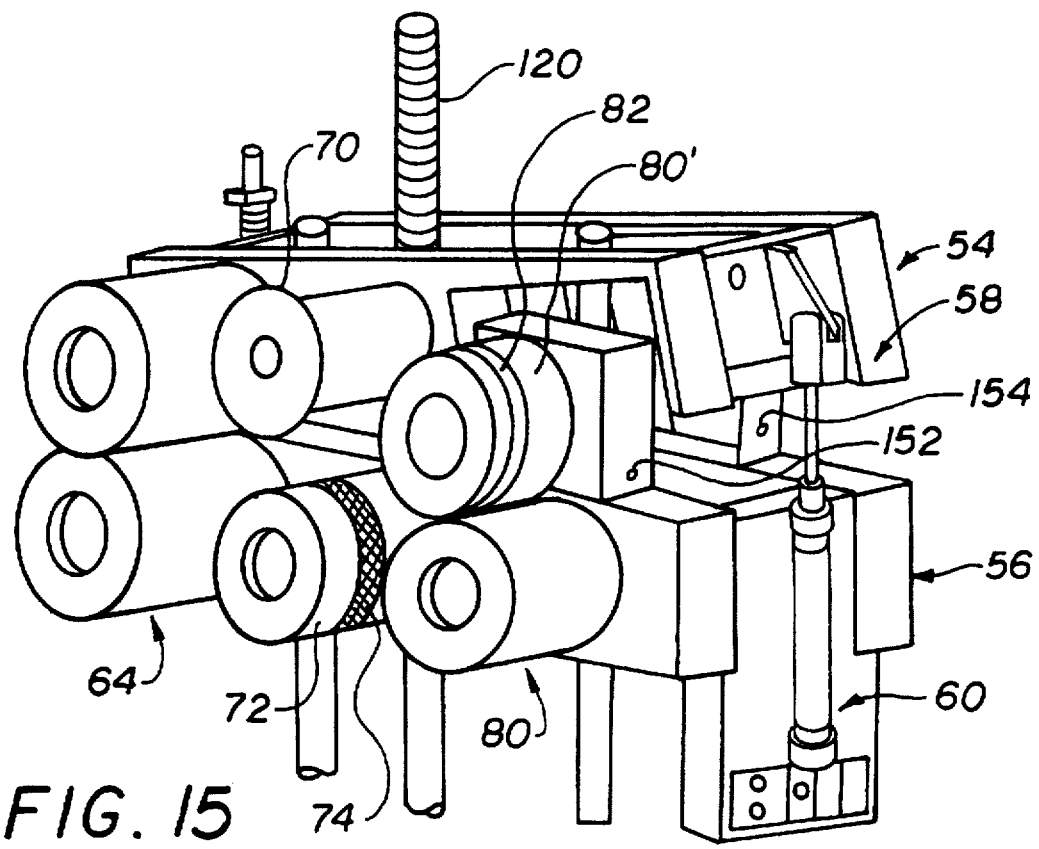
FIG. 15 is is an enlarged perspective view showing unit components of said second embodiment in a nonfunctional mode thereof.
Figure 14:
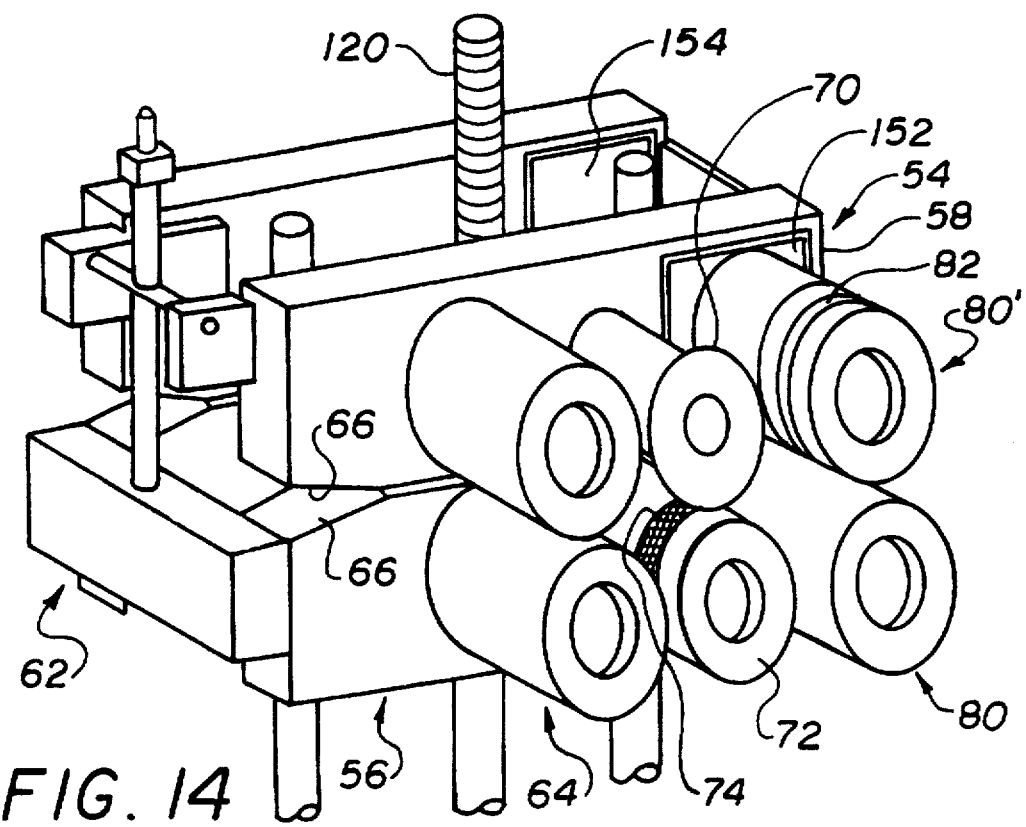
FIG. 14 is an enlarged perspective view showing components forming the second embodiment at the station in a functional mode thereof.
Figure 16:
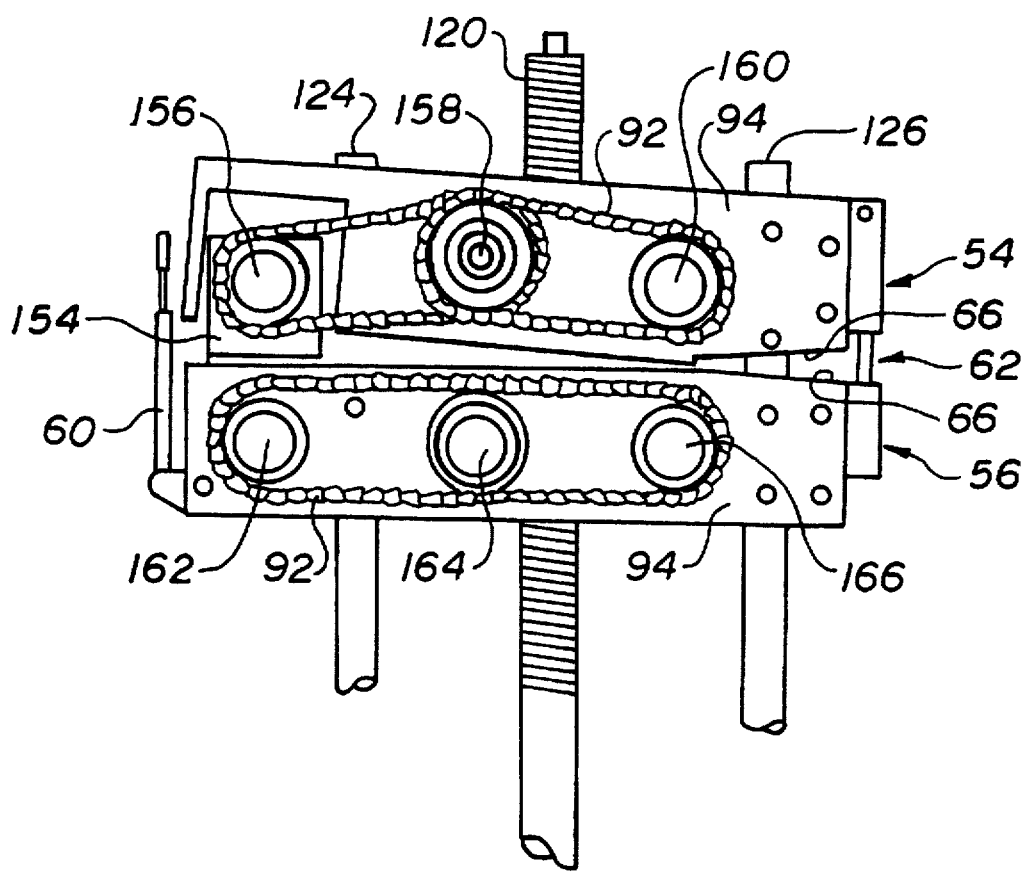
FIG. 16 is a rear view of the second embodiment of the unit.

Another embodiment of the side seal and trim apparatus is shown in FIGS. 14–16.

Figure 5:
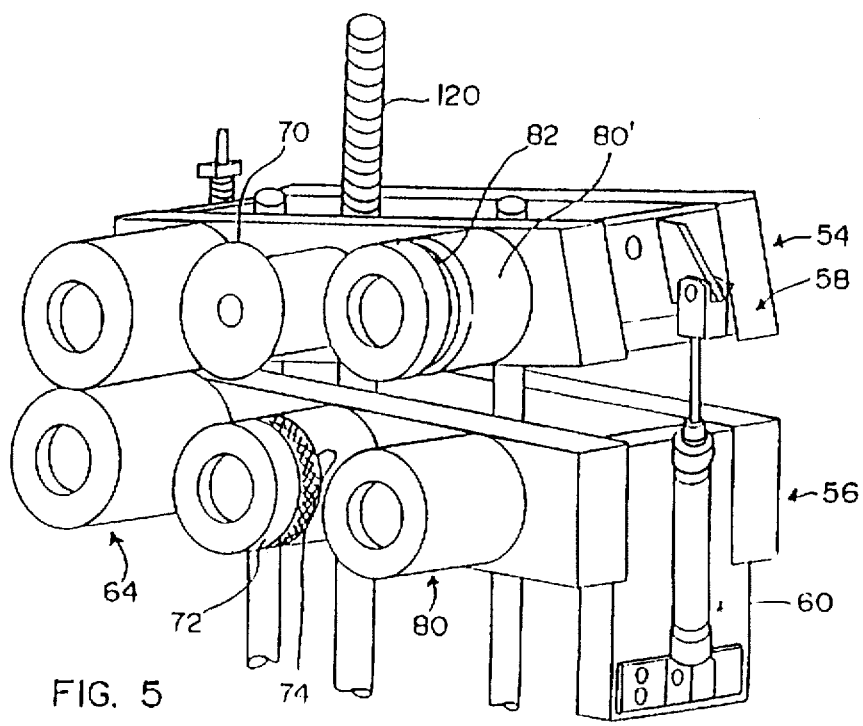
FIG. 5 is an enlarged perspective view showing unit components in a nonfunctional mode thereof.

There are times when it is desirable to keep the film taut and aligned during restarting of the machine under special load or film conditions, wherein both drive members 64, 80, and 80' remain adjacent at all times. To facilitate this action, the upper drive and alignment member 80' has its own shaft and mounting assembly, 152 and 154, as shown in FIGS. 14 and 15 independent of the upper jaw 54 that has the ability to be either locked to the upper jaw 54 as shown in FIG. 15 and functions as illustrated in FIG. 5 or disengaged and allowed to remain abutting at all times, as shown in FIG. 14. Mounting and shaft assembly 154 as shown in FIG. 16 can be driven by chain means, motor means, e.g., drive motors, and any other individual drive means. Each of the six shafts, 156–166, as shown in FIG. 16, can be individually driven.

Also, modifications may be proposed without departing from the things herein. Accordingly, the scope of the invention is only to be limited as necessitated by the accompanying claims.

We claim:

1. A side seal and trim unit for use in a continuously operating wrapping machine wherein articles being wrapped are first sequentially and longitudinally overwrapped with a continuous film, said unit comprising a pair of horizontal jaws comprising an upper jaw and a lower jaw; each of said jaws including, a first alignment and drive wheel, a section of a rotatable heat sealing and cutting assembly and a second alignment and drive wheel, said first and second alignment and drive wheels and said section of said rotatable heat sealing and cutting assembly on said lower jaw being actively driven; said first and second alignment and drive wheels and said section of said rotatable heat sealing and cutting assembly on said upper jaw being actively driven when said jaws are functionally engaged against one another.

2. The unit of claim 1, wherein said first alignment and drive wheels on said upper and lower jaws are constantly maintained engaged.

3. The unit of claim 1, wherein said jaws are hingedly fixed to one another at a leading end thereof and are separable at a trailing end thereof, said trailing ends of said jaws are engaged to one another by a hydraulic piston and cylinder arrangement.

4. The unit of claim 3, wherein said jaws at the leading end thereof have a ramped abutment surface which maintains abutment of said hinged end of said jaws when the opposite ends of said jaws are separated from one another.

5. The unit of claim 1, wherein said section sealing and cutting assembly mounted on said lower jaw comprises a rotatable base member in the form of a wheel having a circumferential portion thereof made of an insulating material, and cutting assembly mounted on said upper jaw comprises a heater head which is rotatably mounted by means of a hollow shaft, said heater head including a ceramic heat element therein, having a configuration to produce a circumferential tip being positioned to engage against said circumferential portion of said base member which is made of insulating material.

6. A side seal and trim apparatus for adhering together free side edge portions of tubular overwrap extended circumferentially about an article from a continuous film in an area alongside the article and trimming away excess film, the apparatus comprising: two jaws, one being an upper jaw and the other being a lower jaw, said jaws being hingedly fixed to one another at a leading end thereof and being separable at a trailing end thereof, said trailing ends of said jaws being engaged to one another by a hydraulic piston and cylinder arrangement, each of said jaws having engaged thereon a first alignment and drive wheel, a section of a rotatable heat sealing and cutting assembly, and a second alignment and drive wheel 7. The apparatus of claim 6, wherein said second alignment and drive wheel on said lower jaw is actively driven and drives, by drive means, said first alignment and drive wheel and said section of said rotatable heat sealing and cutting assembly mounted on said lower jaw.

8. The apparatus of claim 7, wherein said second alignment and drive wheel on said lower jaw frictionally engages against and drives said second alignment and drive wheel on said upper jaw.

9. The apparatus of claim 8, wherein said second alignment and drive wheel on said upper jaw drives, by drive means, said first alignment and drive wheel and said section of said rotatable heat sealing and cutting assembly mounted on said upper jaw.

10. The apparatus of claim 8, wherein said wheels and said rotatable heat sealing and cutting assembly are all synchronously driven by said drive means when said jaws are functionally engaged to one another.

11. The apparatus of claim 6, wherein said first and second alignment and drive wheels on said upper and lower jaws are constantly maintained engaged.

12. The apparatus of claim 6, wherein said jaws at the leading end thereof have a ramped abutment surface which maintains abutment of said hinged end of said jaws when the opposite ends of said jaws are separated from one another.

13. The apparatus of claim 6, wherein said section of said sealing and cutting assembly mounted on said lower jaw comprises a rotatable base member in the form of a wheel having a circumferential portion thereof made of an insulating material, and cutting assembly mounted on said upper jaw comprises a heater head which is rotatably mounted by means of a hollow shaft, said heater head including a ceramic heat element therein, having a configuration to produce a circumferential tip being positioned to engage against said circumferential portion of said base member which is made of insulating material.

14. The apparatus of claim 13, further comprising means for vertically and horizontally adjusting the apparatus to rest alongside the article.

15. A side seal and trim apparatus for adhering together free side edge portions of a tubular overwrap extended circumferentially about an article from a continuous film in an area alongside the article and trimming away excess film for use in a continuously operating wrapping machine, the apparatus comprising: two jaws, one being an upper jaw and the other being a lower jaw, the jaws being hingedly fixed to one another at a leading end thereof and being separable at a trailing end thereof, said trailing ends of the jaws being engaged to one another by a hydraulic piston and cylinder arrangement, each of said jaws having engaged thereon a first alignment and drive wheel, a section of a rotatable heat sealing and cutting assembly, and a second alignment and drive wheel, and means for vertically and horizontally adjusting the apparatus to rest alongside the article.

16. The apparatus of claim 15, wherein said second alignment and drive wheel on said lower jaw is actively drive and drives, by means of drive chain engagement, said first alignment and drive wheel and said section of said rotatable heat sealing and cutting assembly mounted on said lower jaw.

17. The apparatus of claim 16, wherein said second alignment and drive wheel on said lower jaw frictionally engages against and drives said second alignment and drive wheel on said upper jaw.

18. The apparatus of claim 17, wherein said second alignment and drive wheel on said upper jaw drives, by means of drive chain engagement, said first alignment and drive wheel and said section of said rotatable heat sealing and cutting assembly mounted on said upper jaw.

19. The apparatus of claim 18, wherein said wheels and said rotatable heat sealing and cutting assembly are all synchronously driven by said drive chains when said jaws are functionally engaged to one another.

20. The apparatus of claim 19, wherein said first and second alignment and drive wheels on said upper and lower jaws are constantly maintained engaged.

21. The apparatus of claim 15, wherein said section of said sealing and cutting assembly mounted on said lower jaw comprises a rotatable base member in the form of a wheel having a circumferential portion thereof made of an insulating material, and cutting assembly mounted on said upper jaw comprises a heater head which is rotatably mounted by a means of a hollow shaft, said heater head including a ceramic heat element therein, having a configuration to produce a circumferential tip being positioned to engage against said circumferential portion of said base member, which is made of an insulating material.

22. The apparatus of claim 6, wherein the second alignment and drive wheel on said upper jaw is mounted in an individual shaft and mounting assembly within said upper jaw for continuous engagement and abutment with said second alignment and drive means on said lower jaw.

23. The apparatus of claim 6, wherein said first alignment and drive wheel is independently driven by drive means.

* * * * *